(12) United States Patent
Farner et al.

(10) Patent No.: US 8,511,721 B1
(45) Date of Patent: Aug. 20, 2013

(54) KNOT TYING IMPLEMENT

(76) Inventors: Kim Alan Farner, Rydal, GA (US);
George Robert Rose, Etowah, TN (US);
Betty Lou Wallace, Athens, TN (US)

( * ) Notice: Subject to any disclaimer, the term of this patent is extended or adjusted under 35 U.S.C. 154(b) by 0 days.

(21) Appl. No.: 13/473,759

(22) Filed: May 17, 2012

(51) Int. Cl.
*D03J 3/00* (2006.01)

(52) U.S. Cl.
USPC ............................................. 289/17

(58) Field of Classification Search
USPC ............... 289/13, 17, 18.1; 43/1, 4, 43.16; D22/149
See application file for complete search history.

(56) References Cited

U.S. PATENT DOCUMENTS

| | | | | |
|---|---|---|---|---|
| 3,106,417 | A * | 10/1963 | Clow | 289/17 |
| 3,252,724 | A * | 5/1966 | Kearns | 289/17 |
| 3,756,638 | A * | 9/1973 | Stockberger | 289/17 |
| 3,877,737 | A * | 4/1975 | Chappell | 289/17 |
| 4,403,797 | A * | 9/1983 | Ragland, Jr. | 289/17 |
| 4,573,719 | A * | 3/1986 | Aldridge | 289/17 |
| 5,647,616 | A * | 7/1997 | Hamilton | 289/17 |
| 7,510,220 | B1 * | 3/2009 | Wood | 289/17 |
| D617,866 | S * | 6/2010 | Rustowicz | D22/149 |
| 7,793,458 | B2 * | 9/2010 | Eisbrenner | 43/44.83 |
| 8,146,286 | B2 * | 4/2012 | Wood | 43/4 |
| 2005/0116471 | A1 * | 6/2005 | Muir et al. | 289/17 |

* cited by examiner

*Primary Examiner* — Shaun R Hurley (57) ABSTRACT

Disclosed is an improved knot tying implement consisting of an elongated rigid body containing a silicon rubber insert, bottom and side notches, bottom cavity, a concave grip, and a hook holder which enables an angler to tie a variety of fishing knots such as the modified Hangman's knot, modified Snell knot, modified Nail knot, and modified Blood knot using either monofilament fishing lines, braided or super braided fishing lines, or fluorocarbon fishing lines in an array of fishing line strengths and diameters. This knot tying implement, by the use of an aperture in the silicon rubber insert, allows for an angler's "third hand" as the fishing line, fishing lines, or fish hook are held, in place and without damage, while the angler forms their choice of the desired fishing knot.

10 Claims, 9 Drawing Sheets

KNOT TYING IMPLEMENT

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

TECHNICAL FIELD OF INVENTION

The present invention relates to an implement which assists an angler in the tying and fabrication of fishing knots and to fishing knots which can be fabricated by the implement.

BACKGROUND OF THE INVENTION

For centuries, mankind has struggled with the problems associated with tying a fishing hook to a fishing line. Whether the angler uses a cane pole or an advanced rod and reel combination, an age old problem of securely and effectively tying a fishing hook to a fishing line has often plagued the angler. As it is often said, "a chain is only as strong as its weakest link", the same is true for an angler fishing for sport or a commercial fisherman-or-woman fishing for their profession because the knot which enables the hook or lure to be secured to the fishing line is often the deciding factor between the angler landing the fish or losing the fish. Throughout the years, anglers and inventors have invented a variety of knots and knot tying devices. Many anglers use a variety of hand tied fishing knots for different situations and different line sizes. Some anglers only learn one or two hand tied fishing knots and are placed at a disadvantage when faced with a different situation or using a heavier fishing line tied to a hook or lure. An angler often uses different types of fishing lines and leaders as well as different strengths and sizes of fishing lines in their fishing adventures. These different lines, as well as the different sizes of fishing lines present problems for even an experienced angler when attempting to secure a hook or lure to their respective fishing lines. To complicate matters further, the angler is often faced with severe weather conditions or possesses physical conditions which hamper their knot tying ability.

This invention relates to tools and devices used by anglers, men and women, who fish recreational and commercial, for securing and tying hooks, lures, jigs, spoons, and swivels to monofilament fishing lines, braided fishing lines, and fluorocarbon fishing lines. This invention also enables the angler to secure a monofilament fishing line, braided fishing line, fluorocarbon fishing line, or fly line to a fishing leader material such as monofilament fishing line or fluorocarbon fishing line of lesser, equal, or greater diameters as such with a modified Blood knot. Also, this invention relates to a knot tying implement which can tie a modified Hangman's knot or a modified Snell knot to a hook and a modified Nail knot to a fly line in addition to the aforementioned modified Blood knot.

A variety of hand tied fishing knots have been invented throughout the years with each knot having been successful in their design; however, one fishing knot such as the improved clinch knot, which anglers widely use, may be successful when light lines are secured to hooks and lures but unsuccessful when used to tie heavy or large diameter fishing lines to hooks and lures. Large diameter fishing lines require the angler to tie another knot, such as the Baja knot, to secure heavy and large diameter lines to hooks or lures. Further, the modern day angler uses a variety of fishing lines which include monofilament lines, braided fishing lines, and fluorocarbon fishing lines. The improved clinch knot, for example, when used with braided fishing lines will fail and unravel when subjected to a hooked fish. Because the texture of the braided fishing line is extremely slick, a specialized knot is required to keep the braided fishing line securely tied to the hook or lure.

Numerous hand tied fishing knots require the angler to perform often complicated maneuvers and twists, manipulating the fishing line often around and though loops made by the fishing line as the angler maneuvers and twists the fishing line above the hook or lure with their fingers. For many anglers, numerous hand tied fishing knots are extremely difficult due to dexterity problems, physical problems such as arthritis, physical tremors, and poor eye sight, and weather conditions such as cold or rain. One such complicated knot to tie by hand, the Blood knot, requires the angler to hold two fishing lines within their hands, create a loop with their thumb or finger using the two fishing lines and then wrap one fishing line around the other fishing line on one side of the loop and then wrap the fishing line around the fishing line on the other side and then thread one end of one fishing line through the loop from one side and the other end of the fishing line through the other side of the loop. The angler then is required to grasp both end lines in their hands and pull both end lines apart in opposite directions forming the Blood knot. After forming the Blood knot, the angler then grasps the main fishing line, in one hand, and the other fishing line, in the other hand, and begins to pull the lines in opposite directions from one another tightening the Blood knot.

Numerous prior art attempts have been made, by several inventors, to solve the age old problem of anglers to tie an effective, strong, and secure fishing knot to a hook, lure, or swivel or address the problem of effectively tying fishing line to another fishing line or a fishing line to a leader line. Prior art attempts have also been made, by several inventors, to address the problems of tying a fishing knot in adverse weather conditions and assist anglers who suffer from a physical condition such as arthritis, tremors, or poor eye sight. Some prior art attempts have also claimed that their knot tying devices were a fisherman's-or-woman's third hand; however, most require the fisherman-or-woman to maintain their grip upon the fishing line or lines while holding the device when tying the fishing knots. Furthermore, some prior art requires the angler to perform complicated actions such as the manipulation of the fishing line around the knot tying device which require an angler to have an advanced amount of dexterity and good to excellent eye sight. Further, some prior art requires the fisherman or woman to complete a more complicated manipulation of the fishing line to effectively tie the knot than if the fisherman or woman had used their own hands, to tie the knot, without the use of any such device.

This invention also relates to an angler's "third hand" as it incorporates a silicon rubber insert with an aperture which enables the angler to thread the fishing line or fishing lines through the aperture in the silicon rubber insert effectively holding the fishing line or fishing lines while the angler concentrates on fabricating the fishing knot whether the fishing knot is a modified Hangman's knot, Snell knot, Nail knot, or Blood knot.

This invention also relates to an angler's safety as it incorporates a hollow hook holder, at the front of the invention, which protects the angler from the sharp point of the hook being tied. Also, this invention allows an angler to tie a variety of sizes of hooks, lures, and swivels to monofilament fishing lines, braided fishing lines, and fluorocarbon fishing lines.

This invention enables, through the use of a large bottom cavity, the angler to easily feed the fishing line or fishing lines through the knot tying implement which forms the angler's knots such as the modified Hangman's knot, Snell knot, Nail knot, and Blood knot. Prior art contains small grooves which the fisherman or woman had to thread the line into and some prior art required the fisherman or woman to thread the fishing line into the same small groove twice or more.

Further, this invention relates to a knot tying implement which can be easily fabricated by molding of plastic or machined from a variety of materials such as metal or wood and is inexpensive to manufacture providing the angler, inexperienced or experienced, with a knot tying implement which is simple and effective but can easily tie a variety of different fishing knots using a variety of fishing lines and a variety of fishing line sizes safely, securely, and without difficulty. The present invention can be held comfortably in the hand of a child or an adult and also provides the angler suffering from a physical condition such as arthritis, tremors, or poor eye sight with a safe and efficient method of tying fishing knots. The present invention can also be easily carried, in the pocket or tackle box, by the angler and is lightweight and durable.

Prior art known to these inventors:

U.S. Pat. No. 2,646,298 granted to J. C. Leary, 21 Jul. 1953, discloses a tool which enabled an individual to tie together the ends of two pieces of cord, twine, or wire.

U.S. Pat. No. 2,689,147 granted to F. A. Smalley, 14 Sep. 1954, discloses a hand tool enabling an individual to tie together the ends of two pieces of flexible line or fishing line together thereby joining the two lines.

U.S. Pat. No. 2,689,624 granted to J. A. Thomas et al, 21 Dec. 1954, discloses a portable knot tying device with an open groove, in one end of the device, and two notches in the sides of the top of the open groove. This portable knot tying device describes the angler placing the eye of the fish hook into the open groove between the two sides containing notches and the fishing line is inserted through a notch on one side of the device, through the eye of the hook, and then through the other notch on the other side of the device. This portable knot tying device then describes the angler wrapping the fishing line around the device and then inserting the fishing line into the longitudinal slot of the device and through the whipping.

U.S. Pat. No. 2,758,858 granted to A. J. Smith Sr., 14 Aug. 1956, discloses a knot tying implement with an elongated handle and a winding mandrel at one end of the implement with grooves and channels which the free end of the fishing line may be fed, by the angler, to complete the knot.

U.S. Pat. No. 2,825,592 granted to R. McK. Semple, 4 Mar. 1958, discloses a portable knot tying device for smooth filaments, especially the splicing of lines to one another.

U.S. Pat. No. 2,926,036 granted to H. G. Wimberly, 23 Feb. 1960, discloses a fisherman's knot tying tool comprising of a means to tie a fishing line to a fishing hook and also comprises a fish scalar, a hook disgorger, and a screw driver.

U.S. Pat. No. 2,947,558 granted to G. R. Bethune Jr., 2 Aug. 1960, discloses a knot tying apparatus for tying of a Blood knot or Barrel knot.

U.S. Pat. No. 2,992,029 granted to W. R. Russell, 11 Jul. 1961, discloses a snelling tool for fish hooks with the tool resembling that of a key with a groove in the shaft of the tool which enables the angler to tie a Snell knot by placing the shaft of the hook parallel with the shaft of the tool and then wrapping the fishing line around the shaft of the tool and shank of the hook and then inserting the fishing line through the groove in the shaft of the tool underneath the wraps which were wrapped around the tool and shank of the hook.

U.S. Pat. No. 3,106,417 granted to D. J. Clow, 8 Oct. 1963, discloses a knot tying device comprising of elongated U shaped body having a pair of spaced parallel side members which enables the angler to place the threaded hook on one end and then place the fishing line through the pair of spaced parallel side member and then enabling the angler to wrap the end of the fishing line around the two parallel side members after which the angler re-inserts the end of the fishing line through the two parallel side members and underneath the wraps which had been made around the device.

U.S. Pat. No. 3,131,957 granted to D. F. Musto, 5 May 1964, discloses an apparatus for tying leaders and lines comprising of an elongated tubular member with a slot whereas the angler inserts the fishing line through a hook eye and then into the slot of the elongated tubular member and then wraps the fishing line around that of the elongated tubular member.

U.S. Pat. No. 3,494,648 granted to H. L. Stephens, 10 Feb. 1970, discloses a device for tying knots in monofilament lines.

U.S. Pat. No. 3,712,651 granted to P. B. Shockley, 23 Jan. 1973, discloses a knot tying device characterized by a pair of resiliently closed jaws for holding hooks or fishing lines with a sliding tube for forming wraps of the fishing line.

U.S. Pat. No. 3,787,081 granted to C. L. Macy, 22 Jan. 1974, discloses barrel knot tying device with an inner U shaped member and an outer U shaped member with a notched member between the two U shaped members.

U.S. Pat. No. 3,837,691 granted to R. N. Smythe, 24 Sep. 1974, discloses a knot tying apparatus and fish disgorger comprising of an elongated rigid body with two flange portions with a groove extending along the length of the apparatus with a slot in the elongated portion opposite the knot tying end of the apparatus. The angler, using this apparatus, threads the fishing line through the eye of the fish hook or lure, places the hook or lure in the slot opposite the knot tying end of the apparatus, threads the fishing lines into the groove running the length of the apparatus, wraps the end of the fishing line around the apparatus towards that of the hook or lure, and then re-inserts the end of the fishing line into the groove running the length of the apparatus.

U.S. Pat. No. 3,873,140 granted to P. P. Bloch, 25 Mar. 1975, discloses a fish hook holder and knot tying device comprising of a main barrel, a removable end cap, and a spring clip hook holder.

U.S. Pat. No. 4,101,152 granted to W. E. Gardipee, 18 Jul. 1978, discloses a fisherman's knot tying jig comprising of an elongated body with a tapered end and also a blunt end.

U.S. Pat. No. 4,400,025 granted to R. R. Dennison, 23 Aug. 1983, discloses a leader tying vice device comprising of an U shaped base portion with two spaced apart legs.

U.S. Pat. No. 4,403,797 granted to E. Ragland Jr., 13 Sep. 1983, discloses a fishing knot line tying tool of an elongated and planer body with a hook holding tube at the front of the tool and a pair of notched fins at the rear of the tool with a lateral projection of rubber like material. The angler, using this tool, inserts the fishing line into the rubber like projection, then threads the eye of the hook, placing the hook inside the tubular hook holder, and with the end of the fishing line, in hand, places the end of the fishing line into a notch in one fin and then places the end of the fishing line in the notch in the other fin, the angler then runs the end of the fishing line towards the hook and wraps the end of the fishing line around that of the tubular hook holder twice and then proceeds to run the end of the fishing line back toward the two fins placing the end of the fishing line underneath the line between the two fins and above the tool.

U.S. Pat. No. 4,660,314 granted to O. R. Janssen et al, 28 Apr. 1987, discloses a hook sneller and line cutter consisting of an elongated housing having a sneller mechanism on one end and a line cutter incorporated within a clip on the elongated housing.

U.S. Pat. No. 4,864,762 granted to D. D. Cox, 12 Sep. 1989, discloses a line tying device comprising of an elongated mandrel with a ring structure at the opposite in of the line tying device and a depression and groove at the line tying device.

U.S. Pat. No. 5,098,137 granted to T. E. Wardall, 24 Mar. 1992, discloses a device for facilitating knot tying comprising of a generally flat and rectangular device with a hole at one end and a fork at the other.

U.S. Pat. No. 5,240,295 granted to D. R. Spencer, 31 Aug. 1993, discloses a knot tying device comprising of a frame with two legs, a gap between the legs, and two winders along an axis of the legs of the knot tying device.

U.S. Pat. No. 5,593,189 granted to J. Little, 14 Jan. 1997, discloses a knot tying device comprising of a unitary elongated main body with a working end and a second handle end.

U.S. Pat. No. 5,647,616 granted to H. W. Hamilton, 15 Jul. 1997, discloses a safety fishhook dispenser and tying device comprising of an elongated, thin, multi-curved implement with a cylindrical longitudinal bore through the implement.

U.S. Pat. No. 5,685,037 granted to M. J. Fitzner et al, 11 Nov. 1997, discloses a tool for tying fishing line comprising of support body with and a hook holding mechanism.

U.S. Pat. No. 5,690,369 granted to W. F. Steck III, 25 Nov. 1997, discloses a fisherman's knot tying device comprising of a base with two spaced-apart legs at right angles.

U.S. Pat. No. 5,971,447 granted to W. F. Steck III, 26 Oct. 1999, discloses a fisherman's knot tying device comprising of a solid rod comprising of cylindrical portion and a tapered portion with two longitudinally grooves within the solid rod.

U.S. Pat. No. 6,322,112 granted to F. R. Duncan, 27 Nov. 2001, discloses a knot tying apparatus configured in the shape of a fish wherein the holding members consists of hinged connections.

U.S. Pat. No. 6,715,804 granted to D. J. Beers, 6 Apr. 2004, discloses a fisherman's knot tying comprising of an upper and lower elongated body with an alligator clip attached in the shape of a retraceable ball point pen.

BRIEF SUMMARY OF THE INVENTION

In general, this knot tying implement has a rigid elongated body with a tubular hook holder at the front of the implement and incorporates several unique and novel features such as a silicon rubber insert, at the rear of the implement, which is capable of holding securely a fishing line, multiple fishing lines, or a fishing line combined with the shank of a fish hook. The silicon rubber insert and the aperture through the rubber provide the angler with an effective "third hand" and also will not damage the fishing line or lines when the line or lines are placed into or removed from the knot tying implement. This knot tying implement also incorporates two notches, one on the rear side and the other on the rear bottom, to assist the angler in beginning the wrap or wraps of the fishing line around the knot tying implement. Another feature is the large bottom cavity which provides the angler with an easy and almost effortless means to thread the fishing line or fishing lines underneath the wrap or wraps of the fishing line which surround the knot tying implement. The knot tying implement also provides a sleek and slender body with a small grip suitable for the index finger of either an adult's hand or that of a child's hand and can be held with the thumb and index finger of one hand.

The principle objects of this knot tying implement are to provide the angler with an implement which assists the angler in tying knots, in an efficient and safe manner, such as the modified Hangman's knot and modified Snell knot to a fish hook or lure using a wide variety of different fishing lines such as monofilament fishing lines, braided or super braided fishing lines, and fluorocarbon fishing lines of varying line strengths to 80 pound test. Another object of the present knot tying implement is to provide an angler with an efficient and quick method of joining a fly line with a tippet or leader through the use of a modified Nail knot and yet another object is to provide an angler with an efficient, quick, and superior knot when joining a monofilament fishing line or braided fishing line to a leader of lesser, equal, or greater diameter of either monofilament material or fluorocarbon material.

REFERENCE NUMERALS IN DRAWINGS

N—Knot Tying Implement
1—Hollow Hook Holder
2—Thumb Pad

3—Silicon Rubber
4—Aperture
—Side Notch
6—Bottom Notch
7—Bottom Cavity
8—Index Finger Grip
9—Large Hook Holder Attachment
10—Swivel Attachment
11—Hook
12—Fishing Line
12A—Main Fishing Line to Rod and Reel
12B—Tag End of Fishing Line
13—Fly Line
14—Tippet
15—Leader Line
16—Modified Hangman's Knot
17—Modified Snell Knot
18—Modified Nail Knot
19—Modified Blood Knot

DETAILED DESCRIPTION OF DRAWINGS

Figure 1:
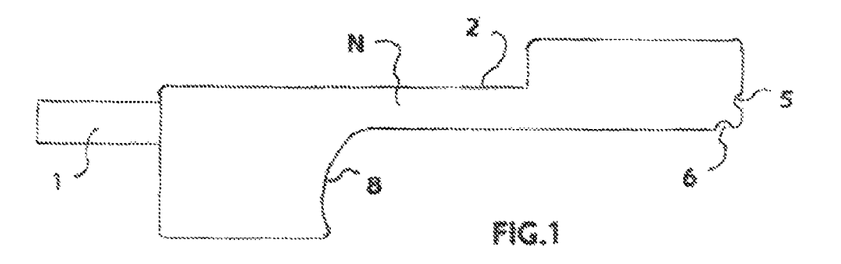
FIG. 1—Side View of Knot Tying Implement
FIG. 2—Front View of Knot Tying Implement
FIG. 3—Rear View of Knot Tying Implement
FIG. 4—Top View of Knot Tying Implement
FIG. 5—Bottom View of Knot Tying Implement
FIG. 6—Large Lure Attachment
FIG. 7—Swivel Attachment
FIG. 8—Knot Tying Implement
FIG. 9—Knot Tying Implement with Large Lure Attachment
FIG. 10—Knot Tying Implement with Swivel Attachment
FIG. 11—Knot Tying Implement with Hook in holder and line through rubber aperture
FIG. 12—Knot Tying Implement Line Wrap for Modified Hangman's Knot
FIG. 12A—Knot Tying Implement Line Wrap Bottom View for Modified Hangman's Knot
FIG. 13—Knot Tying Implement with hook and line captured in rubber aperture
FIG. 14—Knot Tying Implement Line Wrap for Modified Snell Knot
FIG. 15—Knot Tying Implement with fly line and leader in rubber aperture
FIG. 16—Knot Tying Implement Line Wrap for Modified Nail Knot
FIG. 17—Knot Tying Implement with line and leader in rubber aperture
FIG. 18—Knot Tying Implement Line Wrap for Modified Blood Knot
FIG. 19—Modified Hangman's Knot to Hook
FIG. 20—Modified Snell Knot to Hook
FIG. 21—Modified Nail Knot (Fly Line to Leader or Tippet)
FIG. 22—Modified Blood Knot (Line to Leader)

FIG. 1 illustrates a side view of the knot tying implement N with a side view of the hook holder 1, thumb 2, side notch 5, bottom notch 6, and index finger grip 8.

Figure 2:
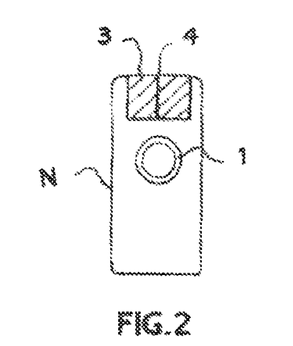

FIG. 2 illustrates the front view of the knot tying implement N with a front view of the hook holder 1, silicon rubber insert 3, and the aperture 4.

Figure 3:
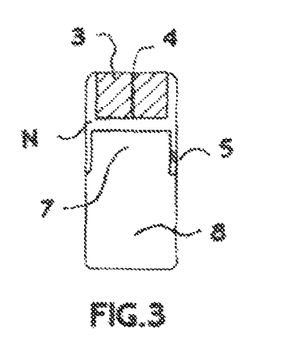

FIG. 3 illustrates the rear view of the knot tying implement N with a rear view of the silicon rubber insert 3, the aperture 4, the side notch 5, bottom cavity 7, and the index finger grip 8.

Figure 4:
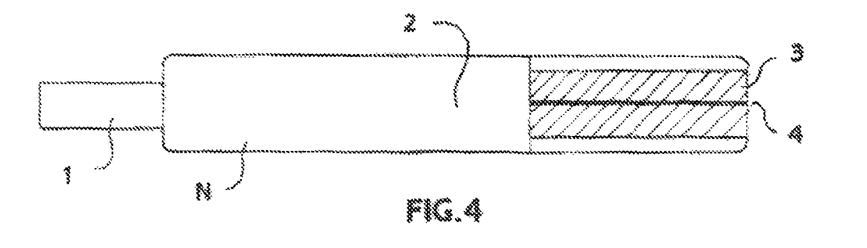

FIG. 4 illustrates the top view of the knot tying implement N with a top view of the hook holder 1, the thumb pad 2, the silicon rubber insert 3, and the aperture 4.

Figure 5:
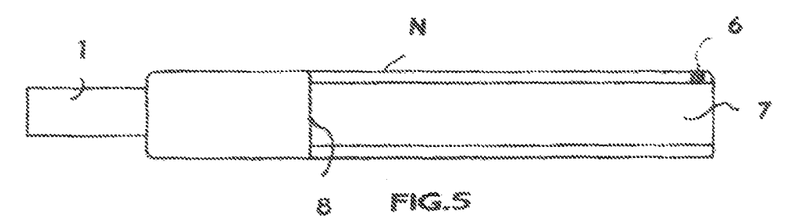

FIG. 5 illustrates the bottom view of the knot tying implement N with a bottom view of the hook holder 1, the bottom notch 6, the bottom cavity 7, and the index finger grip 8.

Figure 6:
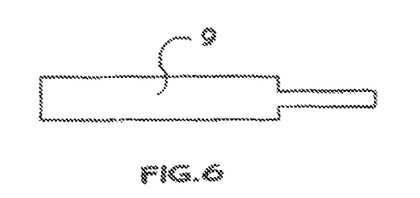

FIG. 6 illustrates the large lure attachment 9.

Figure 7:
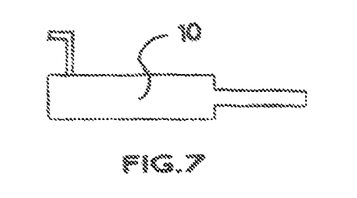

FIG. 7 illustrates the swivel attachment 10.

Figure 8:
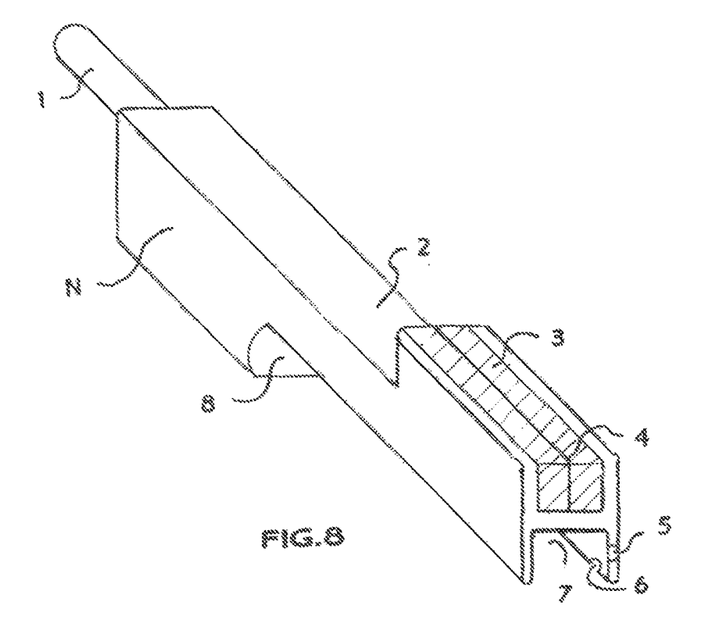

FIG. 8 illustrates a dimensional view of the knot tying implement N with a dimensional view of the hook holder 1, thumb pad 2, silicon rubber insert 3, aperture 4, side notch 5, bottom notch 6, bottom cavity 7, and index finger grip 8.

Figures 9, 10:
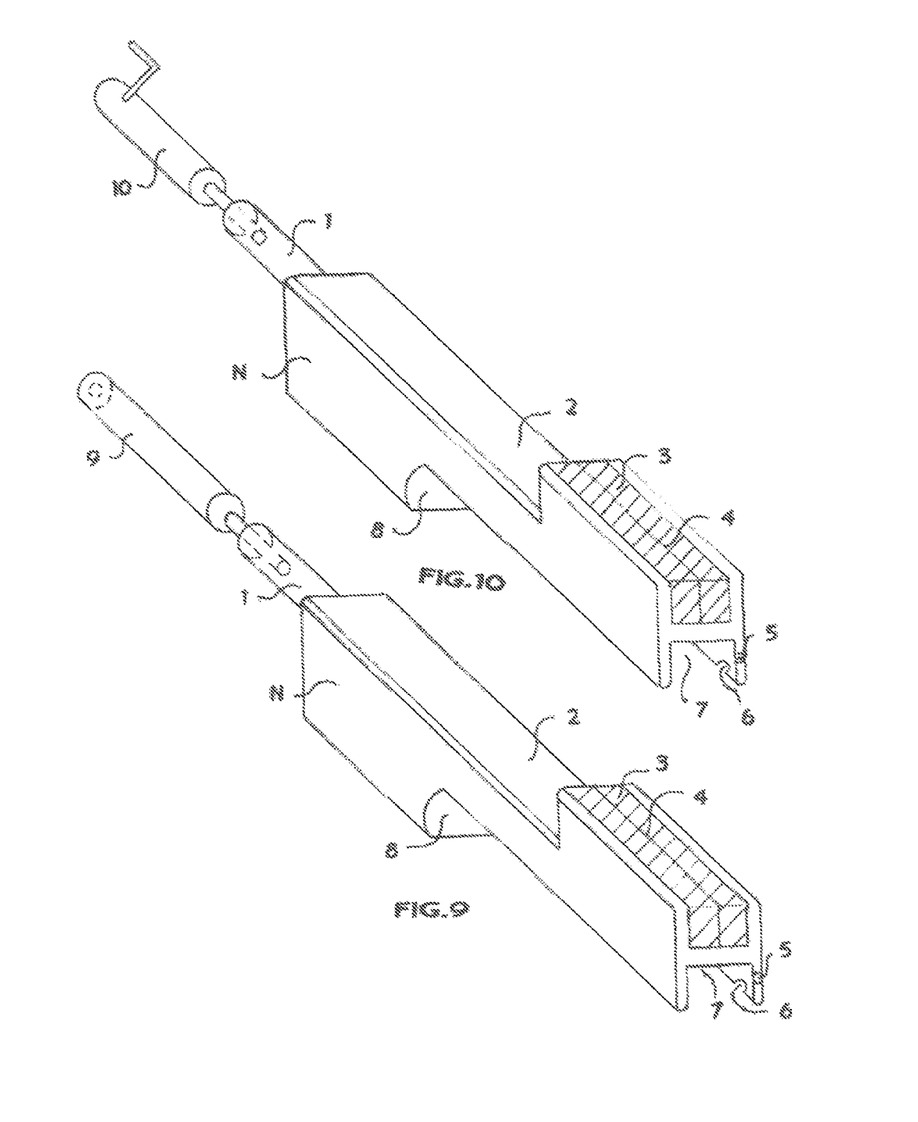

FIG. 9 illustrates a dimensional view of the knot tying implement N with a dimensional view of the large lure attachment 9, hook holder 1, thumb pad 2, silicon rubber insert 3, aperture 4, side notch 5, bottom notch 6, bottom cavity 7, and index finger grip 8.

FIG. 10 illustrates a dimensional view of the knot tying implement N with a dimensional view of the swivel attachment 10, hook holder 1, thumb pad 2, silicon rubber insert 3, aperture 4, side notch 5, bottom notch 6, bottom cavity 7, and index finger grip 8.

Figure 11:
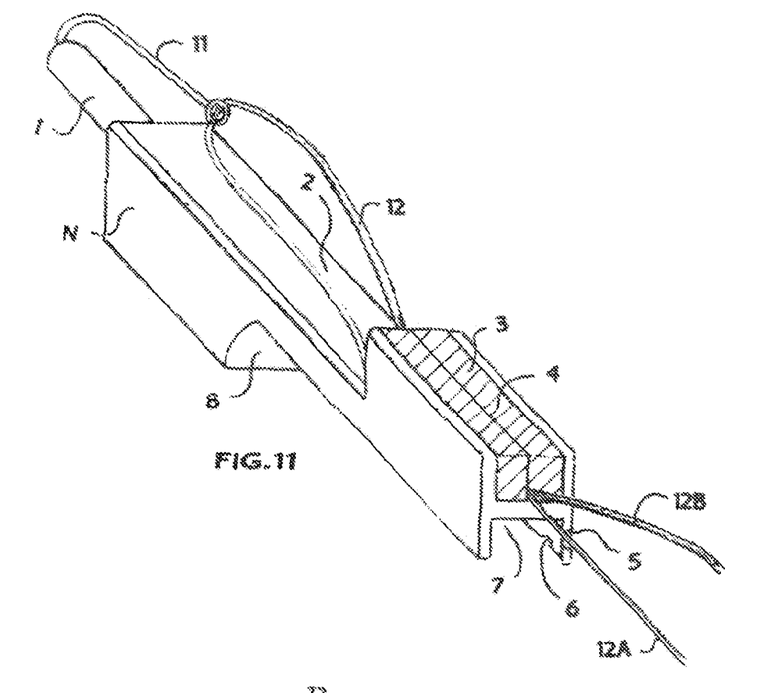

FIG. 11 illustrates a dimensional view of the knot tying implement N with the hook 11 inserted into the hook holder 1 and the fishing line 12 running through the eye of the hook 11. FIG. 11 also illustrates the fishing line 12 being inserted into the silicon rubber insert 3 through the aperture 4 and exiting the rear of the knot tying implement N with the fishing line 12A, from the rod and reel, is also joined by the tag end of the fishing line 12B. FIG. 11 further illustrates the thumb pad 2, side notch 5, bottom notch 6, bottom cavity 7, and the index finger grip 8.

Figure 12:
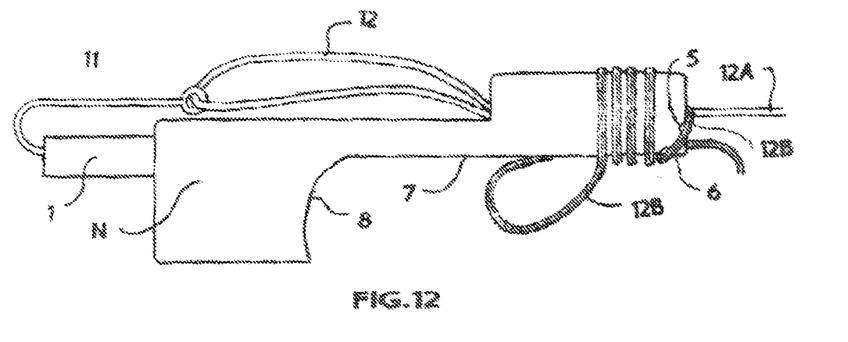

FIG. 12 illustrates a side view of the knot tying implement N after the hook 11 is inserted into the hook holder 1 and the fishing line 12 inserted through the eye of the hook 11 and the fishing line 12 has been inserted into the aperture 4 of the silicon rubber insert 3 by placing the fishing line 12 underneath the angler's thumb of the hand holding the knot tying implement N and between the thumb pad 2 of the knot tying implement N allowing the fishing line 12 to exit the rear of the knot tying implement N allowing the main fishing line 12A and the tag end of the fishing line 12B to be held, in place, by the silicon rubber insert 3 while the angler is holding the knot tying implement N by one hand allowing the index finger of that hand to rest upon the index finger grip 8. In FIG. 12, the tag end of the fishing line 12B is ran through the side notch 5 of the knot tying implement N and then through the bottom notch 6 of the knot tying implement N. The tag end of the fishing line 12B is then wrapped, clockwise or counterclockwise, around the knot tying implement N with each successive wrap moving towards the front of the knot tying implement N and hook holder 1. After three or four successive wraps around the knot tying implement N, the tag end of the fishing line 12B is inserted into the bottom cavity 7 and the tag end of the fishing line 12B is threaded through the bottom cavity 7 over the successive wraps of the fishing line 12B and allowed to exit the rear of the knot tying implement N as explained in FIG. 12A. The main fishing line 12A and the tag end of the fishing line 12B are then grasped together with the angler's free hand and the successive wraps of the tag end of the fishing line 12B are pushed off of the knot tying implement N with the thumb and index finger of the angler's hand holding the knot tying implement N to the rear of the knot tying implement N. The angler then proceeds to remove the hook 11 from the hook holder 1 and then grasps the hook 11 in one hand and the main fishing line 12A and tag end of the fishing line 12B in the other hand and proceeds to pull the hook 11 and the main fishing line 12A and tag end of the fishing line 12B in opposite directions. As the angler pulls the hook 11 away from the main fishing line 12A and tag end of the fishing line 12B, the modified Hangman's knot 16 is formed and tightened.

Figure 12A:
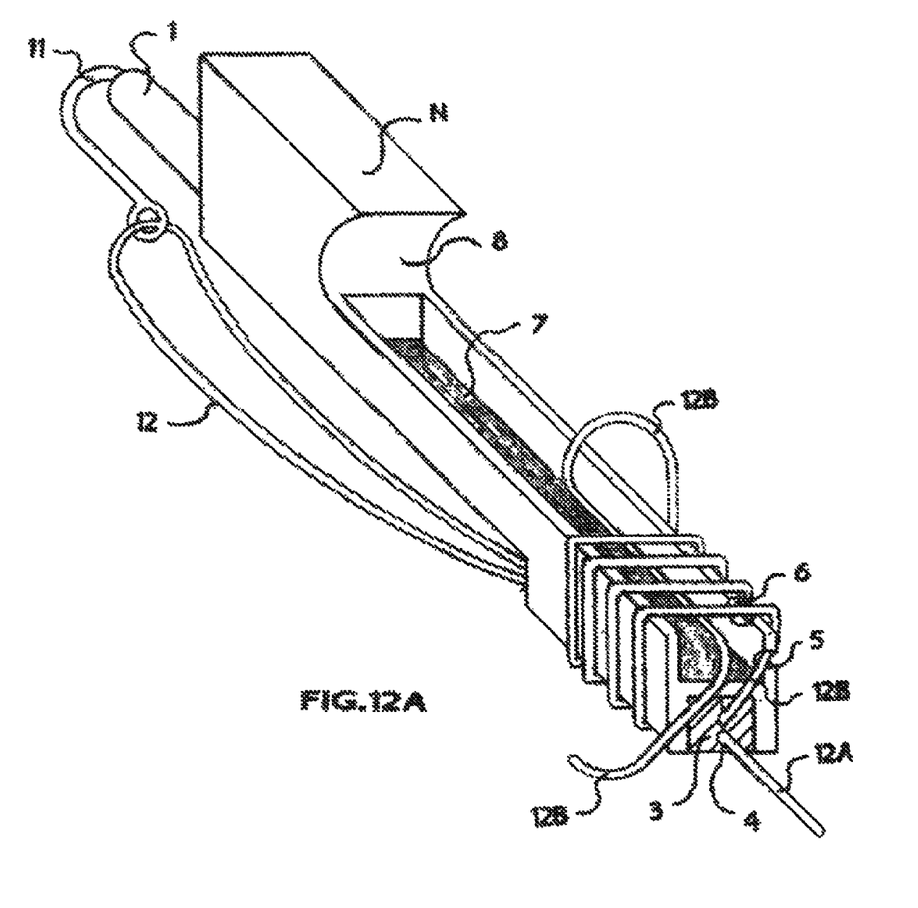

FIG. 12A illustrates a dimensional view of the bottom side of the knot tying implement N with a dimensional view of the hook holder 1, silicon rubber insert 3, aperture 4, side notch 5, bottom notch 6, bottom cavity 7, index finger grip 8, hook 11, fishing line 12, main fishing line 12A, and tag end of fishing line 12B. FIG. 12A further illustrates how the main fishing line 12A and the tag end of the fishing line 12B exit the knot tying implement N through the aperture 4 of the silicon rubber insert 3 and the tag end of the fishing line 12B is placed into the side notch 5 and then into the bottom notch 6. The tag end of the fishing line 12B is then wrapped in successive order around the knot tying implement N with each successive wrap proceeding toward the front of the knot tying implement N and hook holder 1. After completing three to four successive wraps of the tag end of the fishing line 12B around the knot tying implement N, the angler inserts the tag end of the fishing line 12B into the bottom cavity 7 of the knot tying implement N. The tag end of the fishing line 12B is allowed to pass through the bottom cavity 7 over the three or four successive wraps which surround the knot tying implement N and allowed to exit the rear of the knot tying implement N. The angler then grasps the main fishing line 12A exiting the rear of the knot tying implement N and the tag end of the fishing line 12B exiting the rear of the knot tying implement N in one hand and pulls the main fishing line 12A and tag end of the fishing line 12B away from the knot tying implement N while using the thumb and index finger of the other hand holding the knot tying implement N to push the successive wraps of the tag end of the fishing line 12B off of the rear of the knot tying implement N. After removing the successive wraps of the tag end of the fishing line 12B from the knot tying implement N, the angler holding the hook 11 and fishing line 12 in one hand and the main fishing line 12A and tag end of the fishing line 12B in the other hand begins to pull their hands in an opposite direction of one another which forms and tightens the modified Hangman's knot 16.

Figure 13:
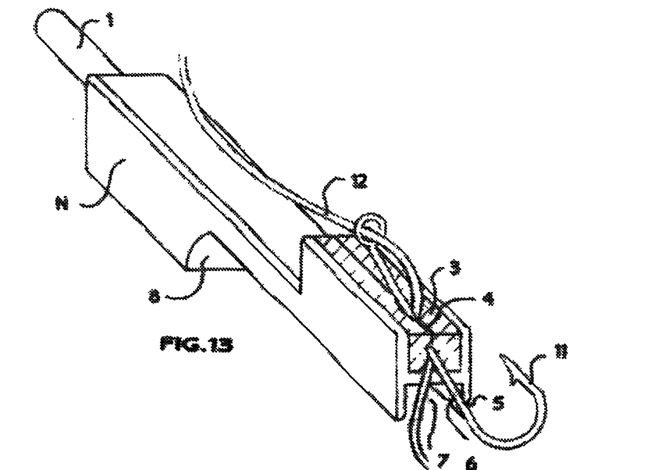

FIG. 13 illustrates a dimensional view of the knot tying implement N with a dimensional view of the hook holder 1, silicon rubber 3, aperture 4, side notch 5, bottom notch 6, bottom cavity 7, and index finger grip 8. FIG. 13 further illustrates how to place a hook 11 and fishing line 12 in the knot tying implement N to begin to tie a modified Snell knot 17. In FIG. 13, the fishing line 12 is inserted through the eye of the hook 11 and the tag end of the fishing line 12B is allowed to run alongside that of the shank of the hook 11. The hook 11 and tag end of the fishing line 12B are inserted into the aperture 4 of the silicon rubber insert 3 at a slight angle at the rear of the knot tying implement N. The main fishing line 12 is then inserted into the aperture 4 of the silicon rubber insert 3 at the front of the silicon rubber insert 3 allowing for the knot tying implement N to securely hold, in place, the hook 11, main fishing line 12, and the tag end of the fishing line 12B.

Figure 14:
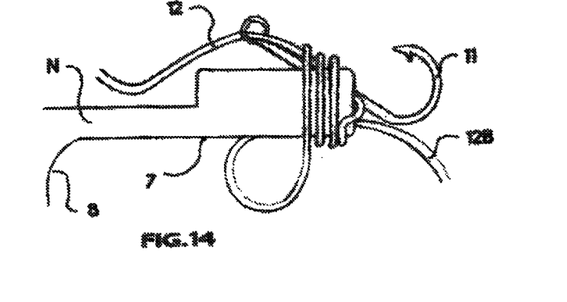

FIG. 14 illustrates a side view of the knot tying implement N after the hook 11 has been threaded with the main fishing line 12 and the main fishing line 12, hook 11, and tag end of the fishing line 12B have been secured in the aperture 4 of the silicon rubber insert 3 of the knot tying implement N for a modified Snell knot 17. FIG. 14 further illustrates a side view of the knot tying implement N in which the tag end of the fishing line 12B is wrapped around the knot tying implement N by beginning at the side notch 5, proceeding to the bottom notch 6, and the making successive wraps, clockwise or counterclockwise, around the knot tying implement N and the shank of the hook 11 with each successive wrap progressing towards the front of the knot tying implement N and hook holder 1. After completing three or four successive wraps around the knot tying implement N and the shank of the hook 11, the angler then inserts the tag end of the fishing line 12 B into the bottom cavity 7 of the knot tying implement N allowing the tag end of the fishing line 12B to pass through the bottom cavity 7 over the successive wraps of the fishing line 12B and allowing the tag end of the fishing line 12B to exit the rear of the knot tying implement N. After the tag end of the fishing line 12B is allowed to pass through the rear of the knot tying implement N, the angler then grasps with one hand, the main fishing line 12A and the tag end of the fishing line 12B. The angler then proceeds to remove the hook 11 from the aperture 4 of the silicon rubber insert 3 of the knot tying implement N while pushing the successive wraps of the tag end of the fishing line 12B off of the rear of the knot tying implement keeping the successive wraps of the tag end of the fishing line 12B on the shaft of the hook 11. The angler, with the main fishing line 12A in one hand, and the tag end of the fishing line 12B, in the other hand, proceeds to pull their hands away from one another developing and tightening the modified Snell knot 17 upon the shaft of the hook 11.

Figure 15:
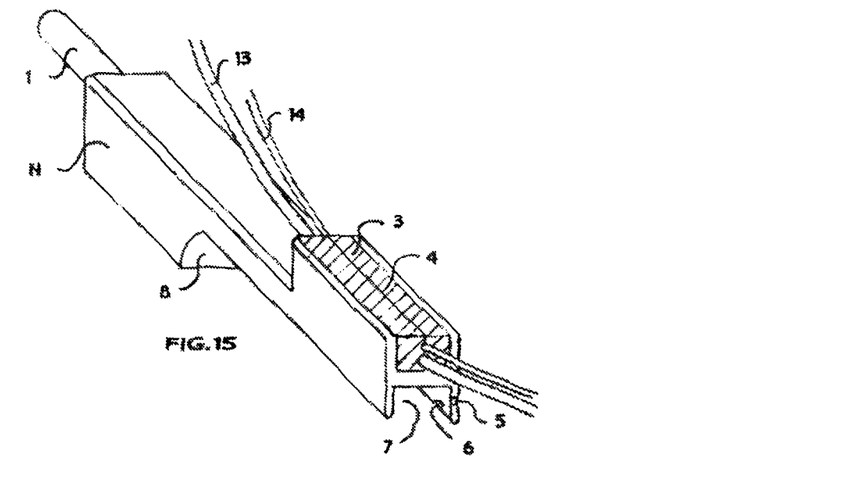

FIG. 15 illustrates a dimensional view of the knot tying implement N with a dimensional view of the hook holder 1, silicon rubber insert 3, aperture 4, side notch 5, bottom notch 6, bottom cavity 7, index finger grip 8, fly line 13, and tippet 14. FIG. 15 further illustrates how the fly line 13 is inserted into the aperture 4 of the silicon rubber insert 3 of the knot tying implement N. The fly line 13 is inserted into the aperture 4 of the silicon rubber insert 3 of the knot tying implement N from the rear of the knot tying implement N allowing 3 or 4 inches of fly line 13 to exit the aperture 4 of the silicon rubber insert 3 of the knot tying implement N towards the front of the knot tying implement N and hook holder 1. FIG. 15 further illustrates how the tippet 14 is inserted into the aperture 4 of the silicon rubber insert 3 of the knot tying implement N. The tippet 14 is inserted into the aperture 4 of the silicon rubber insert 3 of the knot tying implement N from the front of the knot tying implement allowing the tippet 14 to pass through the aperture 4 of the silicon rubber insert 3 and exiting the rear of the knot tying implement N.

Figure 16:
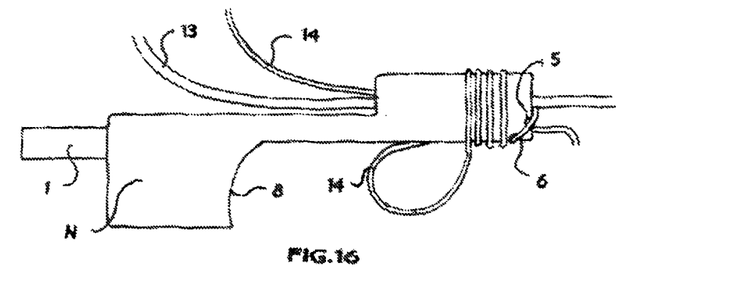

FIG. 16 illustrates a side view of the knot tying implement N with a side view of the hook holder 1, side notch 5, bottom notch 6, index finger grip 8, fly line 13, and tippet 14. FIG. 16 also illustrates how the tippet 14 is wrapped around the knot tying implement N and fly line 13 which is held together with the tippet 14 in the aperture 4 of the silicon rubber insert 3 of the knot tying implement N. The end of the tippet 14 exiting the rear of the knot tying implement N is placed in the side notch 5 of the knot tying implement N and then through the bottom notch 6 of the knot tying implement N. The end of the tippet 14 is then wrapped successively around the knot tying implement N beginning at the rear of the knot tying implement N with three or four successive wraps around the knot tying implement N and fly line 13 proceeding towards the front of the knot tying implement 13 and hook holder 1. After completing three or four successive wraps of the tippet 14 around the knot tying implement N and fly line 13 held in place in the aperture 4 of the silicon rubber insert 3 of the knot tying implement N, the angler then inserts the end of the tippet 14 into the bottom cavity 7 of the knot tying implement N allowing the end of the tippet 14 to pass through the bottom cavity 7 of the knot tying implement N and over the three or four successive wraps of the tippet 14 around the knot tying device N. The end of the tippet 14 exiting the rear of the knot tying implement N and the main fly line 13 are grasped in one hand of the angler and the successive wraps of the tippet 14 around the knot tying implement N are pushed off of the knot tying implement N towards the rear of the knot tying implement N onto the fly line 13. The angler then removes the tag end of the fly line 13 and the main line of the tippet 14 from the aperture 4 and silicon rubber insert 3 of the knot tying implement N with the hand holding the knot tying implement N. The angler then proceeds to pull the main line of the tippet 14 away from the end line of the tippet 14 developing and tightening the Nail knot 18 on the fly line 13 resulting in joining the fly line 13 to the tippet 14.

Figure 17:
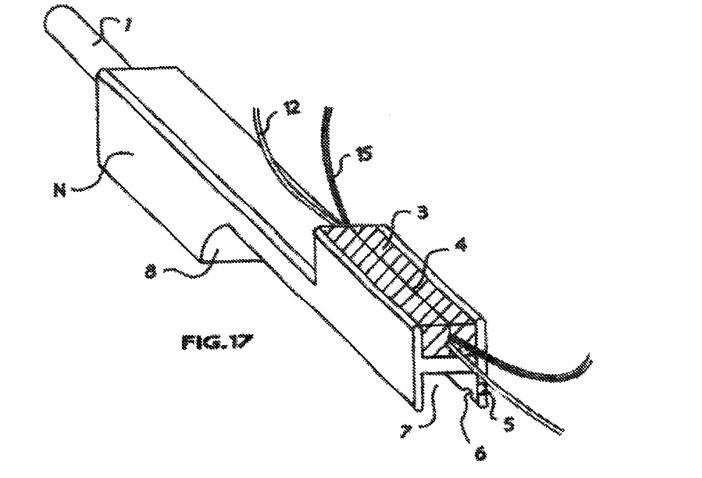

FIG. 17 illustrates a dimensional view of the knot tying implement N with dimensional views of the hook holder 1, silicon rubber insert 3, aperture 4, side notch 5, bottom notch 6, bottom cavity 7, index finger grip 8, fishing line 12, and leader line 15. FIG. 17 further illustrates how to tie a modified Blood knot 19 in which the fishing line 12 is inserted into the aperture 4 of the silicon rubber insert 3 of the knot tying implement N from the front of the knot tying implement N and hook holder 1 with the fishing line 12 passing through the aperture 4 of the silicon rubber insert 3 and allowing several inches of fishing line 12 to exit the rear of the knot tying implement N. The leader line 15 is then threaded into the aperture 4 of the silicon rubber insert 3 of the knot tying implement N from the rear of the knot tying implement N with the leader line passing through the aperture 4 of the silicon rubber insert 3 of the knot tying implement N allowing several inches of the leader line 15 to exit the aperture 4 of the silicon rubber insert 3 towards the front of the knot tying implement N and hook holder 1.

Figure 18:
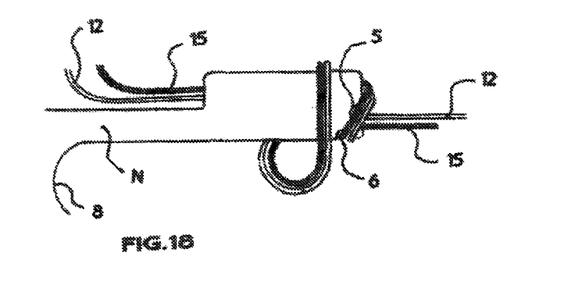

FIG. 18 illustrates a side view of the knot tying implement N with a side view of side notch 5, bottom notch 6, bottom cavity 7, index finger grip 8, fishing line 12, and leader line 15.

FIG. 18 further illustrates how an angler proceeds to tie a modified Blood knot 19. After securing the fishing line 12 and leader line 15 into the aperture 4 of the silicon rubber insert 3 of the knot tying implement N, the angler then grasps the fishing line 12 and the leader line 15 exiting the rear of the knot tying implement N in one hand and begins to wrap the fishing line 12 and leader line 15 around the knot tying implement N beginning at the side notch 5 of the knot tying implement N and proceeding to the bottom notch 6 of the knot tying implement N. The angler then makes one complete wrap around the knot tying implement N with the ends of the fishing line 12 and the leader line 15. After completing one wrap around the knot tying implement N with the ends of the fishing line 12 and leader line 15, the angler then inserts the ends of the fishing line 12 and leader line 15 into the bottom cavity 7 of the knot tying implement N through the bottom cavity 7 and over the wrap of the fishing line 12 and leader line 15 which were wrapped, one time, around the knot tying implement N allowing the ends of the fishing line 12 and leader line 15 to exit the rear of the knot tying implement N through the bottom cavity 7 as illustrated in FIG. 12A. The angler then grasps both ends of the fishing line 12 and leader line 15 in one hand and pulls both ends of the fishing line 12 and leader line 15 taught against the wrap of the fishing line 12 and leader line 15 which are around the knot tying implement N and proceeds to wrap the ends of the fishing line 12 and leader line 15 around the wrap of the fishing line 12 and leader line 15 which have been placed in the bottom notch 6 and wrapped around the knot tying implement N. After the angler has pulled the ends of the fishing line 12 and the leader line 15 taught against the wrap of the knot tying implement N and proceeded with the ends of the fishing line 12 and leader line 15 towards the index finger grip 8, the angler re-inserts the end of the fishing line 12 and the end of the leader line 15 back into the bottom cavity 7 passing through the bottom cavity 7 and over the wrap of the fishing line 12 and leader line 15 which were placed in the bottom notch 6 around the knot tying implement N allowing the ends of the fishing line 12 and leader line 15 to exit the rear of the knot tying implement N through the bottom cavity 7 of the knot tying implement N. After the angler has completed one complete wrap around the knot tying implement N with the end of the fishing line 12 and the end of the leader line 15 and the angler has made three or four complete wraps of the ends of the fishing line 12 and of the leader line 15 around the fishing line 12 and leader line 15 which were placed in the bottom notch 6 of the knot tying implement N, the angler grasps the ends of the fishing line 12 and leader line 15 in one hand and pushes the wrap of the fishing line 12 and leader line 15 off of the rear of the knot tying device while holding the fishing line 12 and leader line 15 which are exiting the aperture 4 in the silicon rubber insert 3 of the knot tying implement N towards the front in their other hand. The angler, with the main fishing line 12 and tag end of the leader line 15 in one hand and the tag end of the fishing line 12 and main leader line 15 in the other hand, begins to pull their hands away from one another. As the angler's hands pull apart from one another, the modified Blood knot 19 will develop and tighten.

Figure 19:
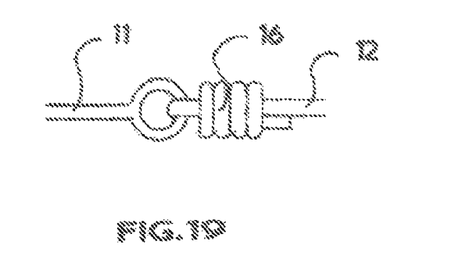

FIG. 19 illustrates a side view of the finished and tightened modified Hangman's knot 16 containing a partial view of the shaft and eye of a hook 11, the fishing line 12, and the finished modified Hangman's knot 16.

Figure 20:
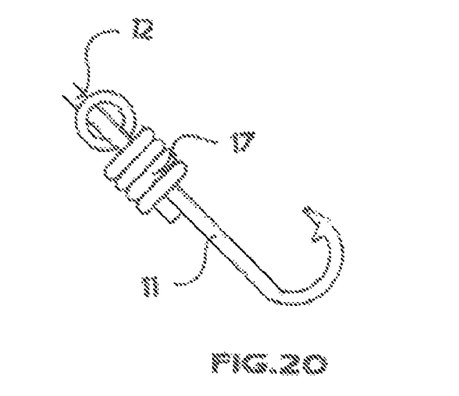

FIG. 20 illustrates a side view of the finished and tightened modified Snell knot 17 containing a hook 11, a fishing line 12, and the finished modified Snell knot 17.

Figure 21:
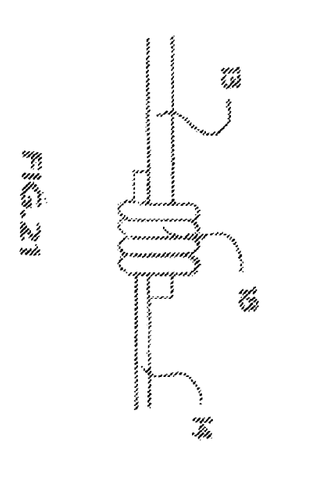

FIG. 21 illustrates a side view of the finished and tightened modified Nail knot 18 containing a fly line 13, a tippet 14, and the finished modified Nail knot 18.

Figure 22:
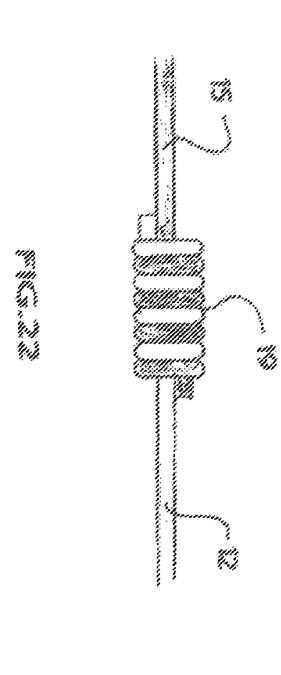

FIG. 22 illustrates a side view of the finished and tightened modified Blood knot 19 containing a fishing line 12, a leader line 15, and the modified Blood knot 19.

What we claim:

1. A knot tying implement comprising of an elongated rigid body consisting of a tubular shaft at the front of the implement, a side notch at the rear of the implement, a bottom notch near the rear of the implement and with the implement having a upper portion at the rear of the implement which consists of two buttresses commencing at right angles to that of the main body of the implement creating a channel supporting a silicon rubber insert with an aperture with said implement having a concave section near the front and on the bottom of the implement and a bottom channel or cavity extending from the concave section to the rear of the implement.

2. A knot tying implement, as described in claim 1, wherein the hollow tubular shaft can accept other similar tubular shaft extensions.

3. A knot tying implement, as described in claim 1, a wherein the silicon rubber inserted at the rear of the implement is incorporated between the two buttresses.

4. A knot tying implement, as described in claim 1 or claim 3, wherein the aperture in the silicon rubber insert has a length and depth equal to that of the length and depth of the rubber insert thereby allowing the said aperture to be vertical throughout the length of the rubber insert.

5. A knot tying implement, as described in claim 1, wherein the side notch at the rear of the implement at the section of knot construction is semicircular in shape.

6. A knot tying implement, as described in claim 1, wherein the bottom notch near the rear of the implement at the section of knot construction is semicircular in shape.

7. A knot tying implement, as described in claim 1, wherein the bottom cavity beginning at the grip or concave portion and extending through the rear of the implement creates a channel underneath having dimensions of length, width, and depth, the dimensions being significantly greater in size than that of the diameter of a fishing line, whereby the fishing line is readily inserted into and through the channel.

8. A knot tying implement, as described in claim 1 or claim 3, wherein the rubber inserted at the rear of the implement has a depth and length equal to that of the depth and length of the buttresses.

9. A knot tying implement, as described in claim 1 or claim 5, wherein the side notch at the rear of the implement is positioned on one side of the rear end vertical section of the implement with the said side notch being perpendicular to the top of the implement.

10. A knot tying implement, as described in claim 1 or claim 6, wherein the bottom notch near the rear of the implement is positioned on one side of the bottom horizontal section or channel wall of the implement in close proximity to the end vertical section with the said bottom notch being parallel to the top of the implement.

* * * * *